US012539823B2

(12) United States Patent
Joko et al.

(10) Patent No.: US 12,539,823 B2
(45) Date of Patent: Feb. 3, 2026

(54) AUTOMOBILE HATCH OPENING/CLOSING DEVICE

(71) Applicant: HI-LEX CORPORATION, Takarazuka (JP)

(72) Inventors: Atsushi Joko, Osaka (JP); Hiromu Daidou, Hyogo (JP)

(73) Assignee: HI-LEX CORPORATION, Takarazuka (JP)

( * ) Notice: Subject to any disclaimer, the term of this patent is extended or adjusted under 35 U.S.C. 154(b) by 578 days.

(21) Appl. No.: 17/288,257

(22) PCT Filed: Oct. 30, 2019

(86) PCT No.: PCT/JP2019/042476
§ 371 (c)(1),
(2) Date: Apr. 23, 2021

(87) PCT Pub. No.: WO2020/090853
PCT Pub. Date: May 7, 2020

(65) Prior Publication Data
US 2021/0380070 A1    Dec. 9, 2021

(30) Foreign Application Priority Data
Oct. 31, 2018    (JP) .................................. 2018-205998

(51) Int. Cl.
*G06F 17/00* (2019.01)
*B60J 5/10* (2006.01)
(Continued)

(52) U.S. Cl.
CPC ................. *B60R 25/01* (2013.01); *B60J 5/10* (2013.01); *E05B 81/06* (2013.01); *E05B 81/56* (2013.01);
(Continued)

(58) Field of Classification Search
CPC .. B60R 25/01; B60J 5/10; E05B 81/06; E05B 81/56; E05B 83/00; E05B 85/243;
(Continued)

(56) References Cited

U.S. PATENT DOCUMENTS 5,140,316 A * 8/1992 DeLand .................. E05B 77/48
340/12.5
8,875,442 B2 * 11/2014 Sohn ..................... E05F 15/622
49/340

(Continued)

FOREIGN PATENT DOCUMENTS

CN      100421978 C  * 10/2008  ............ B60J 5/0479
CN      103806764 B  *  4/2016  ............. E05B 77/38
(Continued)

OTHER PUBLICATIONS

Getting started with the power liftgate system built with a model-based design (Year: 2022).*
(Continued)

*Primary Examiner* — Ronnie M Mancho
(74) *Attorney, Agent, or Firm* — Shih IP Law Group, PLLC

(57) ABSTRACT

An opening/closing body opening/closing device includes: an opening/closing body; a closing mechanism; an opening/driving body driving section; a control section; and a position detection section. The closing mechanism includes an engaging portion, an engaged portion, a closing mechanism-side driving section, and an interaction detection section. The control section causes the closing mechanism-side driving section to perform closing driving and, after the closing driving, sets the engaging part to an open state so as to allow the closing mechanism to lock the opening/closing body through engagement between the engaging portion and the engaged portion when a positional difference between a current position and an engageable position of the opening/
(Continued)

closing body is outside a predetermined range. Use of the opening/closing body opening/closing device makes a zero position of the opening/closing body settable in an originally supposed position even when the closing mechanism operates while the opening/closing body is in an improper position.

6 Claims, 8 Drawing Sheets

(51) Int. Cl.
*B60R 25/01* (2013.01)
*E05B 81/06* (2014.01)
*E05B 81/56* (2014.01)
*E05F 15/622* (2015.01)
*E05F 15/70* (2015.01)
*E05B 83/00* (2014.01)
*E05B 85/24* (2014.01)
*E05B 85/26* (2014.01)

(52) U.S. Cl.
CPC .......... *E05F 15/622* (2015.01); *E05F 15/70* (2015.01); *E05B 83/00* (2013.01); *E05B 85/243* (2013.01); *E05B 85/26* (2013.01); *E05Y 2201/22* (2013.01); *E05Y 2201/434* (2013.01); *E05Y 2201/70* (2013.01); *E05Y 2201/702* (2013.01); *E05Y 2400/32* (2013.01); *E05Y 2400/40* (2013.01); *E05Y 2900/546* (2013.01)

(58) Field of Classification Search
CPC .......... E05B 85/26; E05B 81/20; E05B 81/62; E05B 83/18; E05F 15/622; E05F 15/70; E05Y 2201/434; E05Y 2201/70; E05Y 2201/702; E05Y 2400/32; E05Y 2400/40; E05Y 2900/546; E05Y 2201/22; E05Y 2400/41
USPC .......................................................... 701/49
See application file for complete search history.

(56) References Cited

U.S. PATENT DOCUMENTS

| | | | | |
|---|---|---|---|---|
| 9,522,590 | B2 * | 12/2016 | Fujimoto | H02P 31/00 |
| 9,644,415 | B2 * | 5/2017 | Trombke | E05F 15/70 |
| 10,378,265 | B2 * | 8/2019 | Watanabe | E05B 81/00 |
| 10,458,171 | B2 * | 10/2019 | Khan | E05F 15/42 |
| 11,180,943 | B2 * | 11/2021 | Khan | E05F 15/42 |
| 11,634,939 | B2 * | 4/2023 | Battlogg | E05F 15/611 |
| | | | | 701/49 |
| 2012/0290177 | A1 * | 11/2012 | Wagenhuber | E05F 15/77 |
| | | | | 701/49 |
| 2020/0248493 | A1 * | 8/2020 | Kamemoto | E05F 15/41 |
| 2021/0180388 | A1 * | 6/2021 | Joko | E05B 85/26 |
| 2021/0380070 | A1 * | 12/2021 | Joko | E05F 15/622 |
| 2022/0016960 | A1 * | 1/2022 | Fujiwara | E05F 15/622 |

FOREIGN PATENT DOCUMENTS

| | | | |
|---|---|---|---|
| JP | H0495961 U | * | 8/1992 |
| JP | H09125818 A | * | 5/1997 |
| JP | 2004190416 A | | 7/2004 |
| JP | 4109528 B2 | * | 7/2008 |

OTHER PUBLICATIONS

International Search Report for International Application No. PCT/JP2019/042476; Date of Mailing, Dec. 17, 2019.

\* cited by examiner

AUTOMOBILE HATCH OPENING/CLOSING DEVICE

CROSS REFERENCE TO RELATED APPLICATIONS

This is the U.S. national stage of application No. PCT/JP2019/042476, filed on Oct. 30, 2019. Priority under 35 U.S.C. § 119(a) and 35 U.S.C. § 365(b) is claimed from Japanese Application No. 2018-205998 filed Oct. 31, 2018, the disclosure of which is also incorporated herein by reference.

TECHNICAL FIELD

The present invention relates to an opening/closing body opening/closing device.

BACKGROUND ART

For an opening and closing body in which an opening of a base is set to an opened state or a covered state (hereinafter, also referred to as "opening/closing body"), it is necessary to detect a current position of the opening/closing body in order to stop driving in an appropriate position and/or to perform driving at a driving speed in accordance with the position of the opening/closing body at the time of driving the opening/closing body by a driving section. For such an opening/closing body, it is possible to know the current position thereof, for example, by detection of a pulse signal in accordance with the driving of the driving section. In such signal detection, however, it is known that a transmission error occurs due to change with time and/or the like.

As a means of preventing inaccurate position detection due to an accumulation of such a transmission error and/or the like, an opening and closing device (hereinafter, also referred to as "opening/closing device") has been proposed, which resets an integrated value of pulse signals when a switch member of a closing mechanism operates and which does not reset the integrated value of pulse signals when the opening/closing device is positioned in a fully-closed position (see Patent Literature (hereinafter, referred to as "PTL") 1, for example).

CITATION LIST

Patent Literature

PTL 1
Japanese Patent Application Laid-Open No. 2004-190416

SUMMARY OF INVENTION

Technical Problem

However, in a situation in which the opening/closing body is movable, such as a slope, the opening/closing body may move before the opening/closing body is locked by the closing mechanism. In such a case, when zero position setting in which the integrated value of pulse signals is reset by the operation of the switch member of the closing mechanism by the opening/closing body is performed, the integrated value of pulse signals is reset in a position different from a position where the opening/closing body is locked by the closing mechanism, and thus, it is difficult to distinguish between the position where the integrated value of pulse signals is reset and an originally supposed zero position.

When the integrated value of pulse signals is reset in a position different from the originally supposed zero position and a zero position of the opening/closing body is set, an opening operation of the closing mechanism cannot be performed in the zero position by normal control of a control device. Accordingly, an operator needs to perform the opening operation of the closing mechanism mechanically for each time, and convenience of the opening/closing device decreases.

An object of the present invention is to provide an opening/closing body opening/closing device capable of setting an opening/closing body to a closed state even in a case where a zero position of the opening/closing body is set while the opening and the closing body is in an improper position.

Solution to Problem

An opening/closing body opening/closing device according to the present invention includes:
  an opening/closing body that is opened and closed with respect to an opening of a base;
  a closing mechanism that locks the opening/closing body in a closed state;
  an opening and driving body driving section that causes the opening/closing body to transition to an open state or the closed state;
  a control section that controls driving of the closing mechanism and the opening/closing body driving section; and
  a position detection section that detects a position of the opening/closing body, wherein
  the closing mechanism includes:
    an engaging portion provided in one of the base and the opening/closing body;
    an engaged portion provided in another of the base and the opening/closing body;
    a closing mechanism-side driving section that causes the engaging portion to transition between the open state and the closed state; and
    an interaction detection section that detects that the engaging portion and the engaged portion have interacted with each other, wherein
  the open state of the engaging portion includes a first state in which the engaged portion is movable to a position where the engaged portion is engageable with the engaging portion,
  the closed state of the engaging portion includes a second state in which the engaged portion is locked by the engaging portion,
  when the control section acquires interaction information on occurrence of interaction between the engaging portion and the engaged portion, the control section causes the closing mechanism-side driving section to perform closing driving that causes the engaging portion to transition from the first state to the second state, and
  after the closing driving is performed, the control section sets the engaging portion to the open state so as to allow the closing mechanism to lock the opening/closing body through engagement between the engaging portion and the engaged portion in a case where a positional difference between a current position of the opening/closing body and an engageable position of the opening/closing body where the engagement between the engaging portion and the engaged portion is allowed is outside a predetermined range after comparison between the current position and the engageable position.

Advantageous Effects of Invention

According to the present invention, it is possible to set a zero position of the opening/closing body in an originally supposed position even when a closing mechanism operates while an opening/closing body is in an improper position.

DESCRIPTION OF EMBODIMENT

Hereinafter, an embodiment of the present invention will be described in detail with reference to the accompanying drawings. Note that, in the present embodiment, an automobile which controls opening and closing of a back door is illustrated as an example of opening/closing body opening/closing device 1, but opening/closing body opening/closing device 1 is also applicable to a device that controls opening and closing of a shutter, a sliding door or a hinged door installed at a structure such as a store and a garage, or foldable eaves disposed above an opening of a front of the structure.

[Overall Configuration of Opening/Closing Body Opening/Closing Device]

Figure 1:
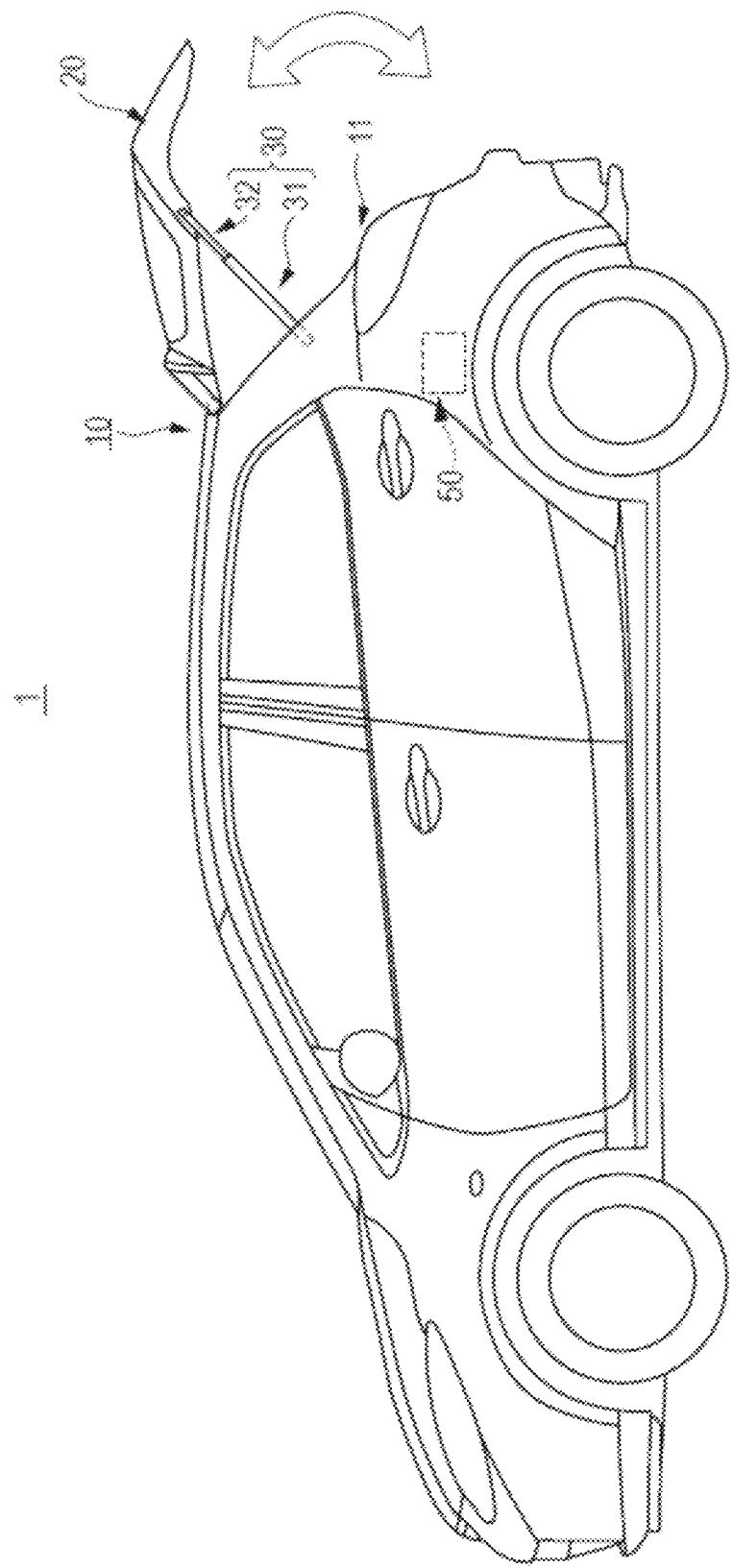
FIG. 1 is a schematic side view of an automobile including an opening/closing body opening/closing device of an embodiment of the present invention.

FIG. 1 is a schematic side view of an automobile including an opening and closing body opening and closing device (hereinafter, also referred to as "opening/closing body opening/closing device") of the present embodiment.

Figure 4:
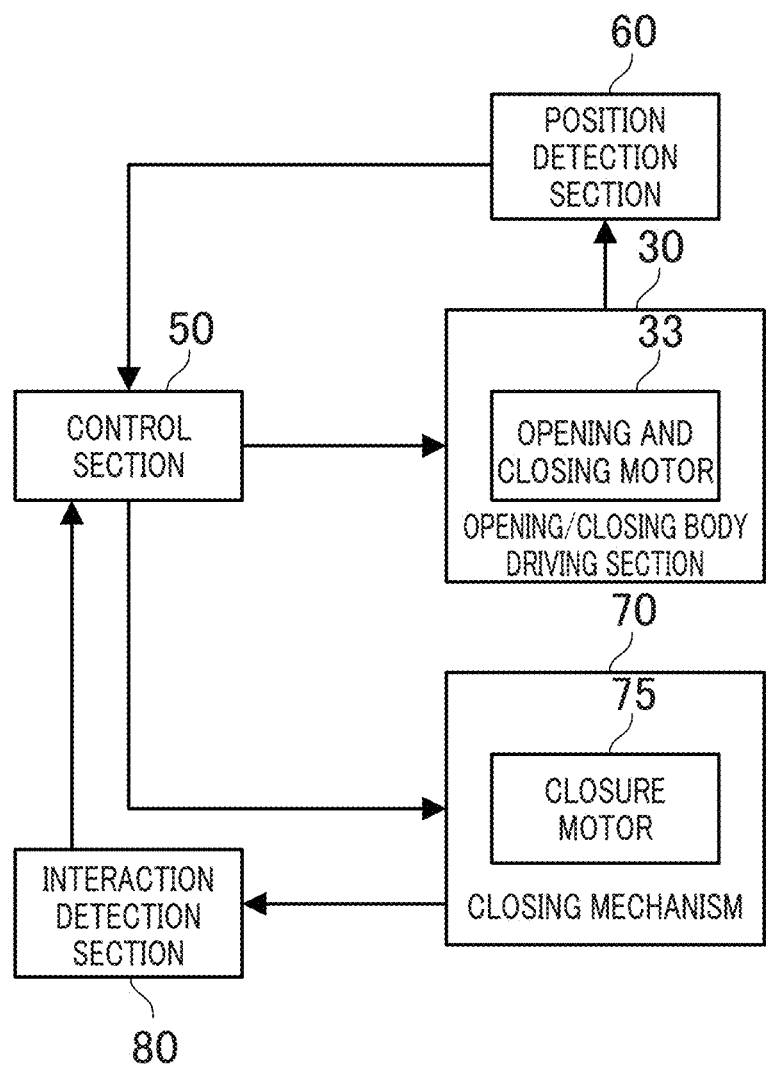
FIG. 4 is a block diagram provided for describing a control system of the opening/closing body opening/closing device.

As illustrated in FIG. 1, opening/closing body opening/closing device 1 includes opening member 10 as an example of a base, opening/closing body 20, opening/closing body driving section 30, control section 50, position detection section 60 (see FIG. 4), closing mechanism 70 (see FIG. 2), and interaction detection section 80 (see FIG. 4).

Opening/closing body opening/closing device 1 is a device that opens and closes opening/closing body 20 with respect to opening 11 of opening member 10.

[Opening Member]

In the automobile using opening/closing body opening/closing device 1 of the present embodiment, opening member 10 is provided in a rear portion with respect to a traveling direction of a vehicle body. Opening member 10 is the vehicle body used in the automobile and opening 11 is formed by an edge portion of opening member 10. The shape of opening 11 may be any shape including a rectangular shape, a circular shape and/or the like.

[Opening/Closing Body]

Figure 2:
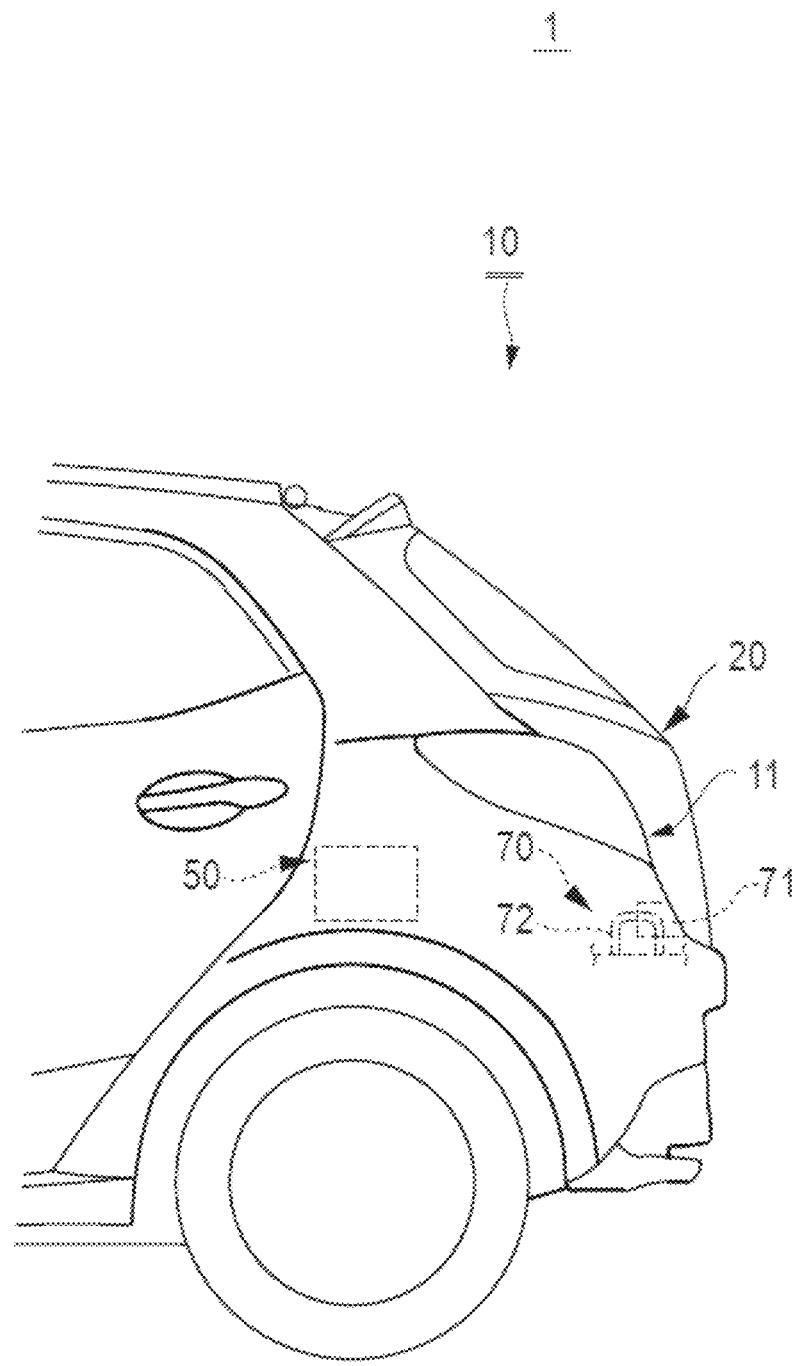
FIG. 2 is a partially enlarged side view of a rear portion of the automobile including the opening/closing body opening/closing device of the present embodiment.

Opening/closing body 20 is a back door of the automobile, and transitions to an open state (see FIG. 1) or a closed state (see FIG. 2). The open state in opening/closing body 20 is a state in which opening 11 is opened. In the rear portion of the vehicle, the open state in opening/closing body 20 is a state in which loading and unloading of an object, such as luggage, into or from a rear trunk via opening 11 from an outside is allowed. The closed state in opening/closing body 20 is a state in which opening 11 is covered. In other words, the closed state can be described as a state when opening/closing body 20 is in a position to block an object, such as luggage, from passing through opening 11 and moving to an opposite side. Further, the open state can be described as a state when opening/closing body 20 is in a position to allow the object to pass through opening 11 and move to the opposite side.

In the present embodiment, an upper side portion of opening/closing body 20 is turnably attached to a side of an upper edge portion of opening 11 in opening member 10 via a shaft portion serving as a hinge. Opening/closing body 20 pivots such that a side of a lower side portion thereof moves up and down about the shaft portion, and comes into contact with or is separated from opening 11, thereby causing opening/closing body 20 to transition to the open state or the closed state. In the present embodiment, the positional change of opening/closing body 20 is realized by the pivoting mechanism described above, but the mechanism for the positional change of opening/closing body 20 is not limited to pivoting and may be any mechanism as long as it is possible to cause opening/closing body 20 to transition to the open state or the closed state.

Note that, opening/closing body 20 may be any opening/closing body as long as the opening/closing body can transition to the open state or the closed state, and may be a slide door, for example.

[Opening/Closing Body Driving Section]

Opening/closing body driving section 30 moves opening/closing body 20 in an opening direction or a closing direction with respect to opening 11 of opening member 10. More than one opening/closing body driving section 30 may be provided. In the present embodiment, opening/closing body driving section 30 is provided one each in total of two to both left and right edges of opening/closing body 20 and both left and right edges of opening 11. By moving opening/closing body 20 by driving respective opening/closing body driving sections 30, opening/closing body 20 is relatively moved with respect to opening member 10 and transitions to the open state or the closed state.

Two opening/closing body driving sections 30 move opening/closing body 20 in a direction in which opening 11 is set to the open state (opening direction) and in a direction in which opening 11 is set to the closed state (closing direction). When it is possible to cause opening/closing body 20 to transition to the open state and the closed state, respective opening/closing body driving sections 30 may drive opening/closing body 20 in the same direction with the same driving amount. Further, as long as two respective opening/closing body driving sections 30 are capable of moving opening/closing body 20 in the opening direction and in the closing direction, two opening/closing body driving sections 30 may drive opening/closing body 20 in different directions with different driving quantities. In the present embodiment, each opening/closing body driving section 30 is provided so as to perform the same driving in synchronization with each other.

Opening/closing body driving section 30 is connected to opening member 10 at one end and is connected to opening/closing body 20 at another end. Opening/closing body 20 is provided to be relatively movable with respect to opening member 10, and, in the present embodiment, is provided in opening member 10 to be pivotable about the hinge. In order for opening/closing body 20 to pivotally move with respect to opening member 10, each opening/closing body driving section 30 is attached such that opening/closing body 20 is pivotable with respect to opening member 10, and causes opening/closing body 20, while pivoting with respect to opening member 10, to transition to the open state or the closed state.

Specifically, each opening/closing body driving section 30 has a telescopic bar shape appearance and includes a driving main-body portion, which is disposed on a side of one end portion of opening/closing body driving section 30 and is connected to a side of opening member 10, and a forward-backward moving section, which is disposed on a side of another end portion of opening/closing body driving section 30 and is connected to a side of opening/closing body 20. The forward-backward moving section is attached so as to be capable of protruding and receding from a side of another end portion of the driving main-body portion. Respective opening/closing body driving sections 30 are connected to opening member 10 and opening/closing body 20, each via a pivotable connection structure such as a ball joint.

Opening/closing body driving section 30 can move, by moving the forward-backward moving section forward and backward in a longitudinal direction of opening/closing body driving section 30 with respect to the driving main-body portion, opening/closing body 20 to a fully-closed position, that is, the position where opening 11 is completely covered, and to a fully-open position, that is, the position where opening 11 is opened to a maximum extent. Each opening/closing body driving section 30 moves opening/closing body 20 in the opening direction or the closing direction by converting a rotary motion of a motor or the like into an extension and retraction motion in a linear direction.

Opening/closing body driving sections 30 are provided one each to both the left and right ends of the rear portion of the automobile in total of two, but the structure, driving system, shape and/or installation position of opening/closing body driving section 30 are not particularly limited as long as opening/closing body driving section 30 allows opening and closing of opening/closing body 20. As opening/closing body driving section 30, a publicly known driving section capable of driving opening/closing body 20, can be employed.

In the present embodiment, opening/closing body driving section 30 includes main-body cylinder portion 31, sliding cylinder portion 32, opening and closing motor 33 (see FIG. 4), a spindle (illustration is omitted), a spindle nut (illustration is omitted), an energizing member (illustration is omitted) and/or the like. In opening/closing body driving section 30, main-body cylinder portion 31, opening and closing motor 33, the spindle, the energizing member and/or the like correspond to the driving main-body portion, and sliding cylinder portion 32 and the spindle nut correspond to the forward-backward moving section.

Main-body cylinder portion 31 is pivotably fixed to opening member 10 on a side of one end portion of main-body cylinder portion 31 and is opened on a side of another end portion thereof. Sliding cylinder portion 32 is disposed inside of main-body cylinder portion 31 such that sliding cylinder portion 32 is slidingly movable in the longitudinal direction so as to protrude or recede from the side of the other end portion of main-body cylinder portion 31.

Opening and closing motor 33 drives to move the forward-backward moving section in the longitudinal direction with respect to the driving main-body section to extend and retract opening/closing body driving section 30. Opening and closing motor 33 is a DC motor or an AC motor. In a case where opening/closing body opening/closing device 1 is applied to an automobile, a DC motor is preferably adopted as opening and closing motor 33 in considering that a DC power supply of the automobile is used. Note that, opening and closing motor 33 is connected to control section 50, and rotational driving of both forward rotation and reverse rotation is controlled by control section 50.

Sliding cylinder portion 32 is energized by the energizing member from a side of one end to a side of another end of main-body cylinder portion 31. Inside of sliding cylinder portion 32, the spindle nut is provided, and the spindle screwed with the spindle nut rotates axially by rotation of opening and closing motor 33.

Opening/closing body driving section 30 is configured such that both main-body cylinder portion 31 and sliding cylinder portion 32 do not corotate due to the rotation of the spindle. When opening and closing motor 33 rotates in a forward or reverse direction, the spindle rotates in an axially forward or reverse direction, and the spindle nut screwed with the spindle moves along the longitudinal direction of the spindle. Along with this movement, sliding cylinder portion 32 including the spindle nut moves forward and backward, that is, slidingly moves in the longitudinal direction. Thus, opening/closing body driving section 30 moves so as to extend and retract, and opening and closing operation of opening/closing body 20 is performed in correspondence to a length of advance of sliding cylinder portion 32 from main-body cylinder portion 31.

[Closing Mechanism]

Figure 3A:
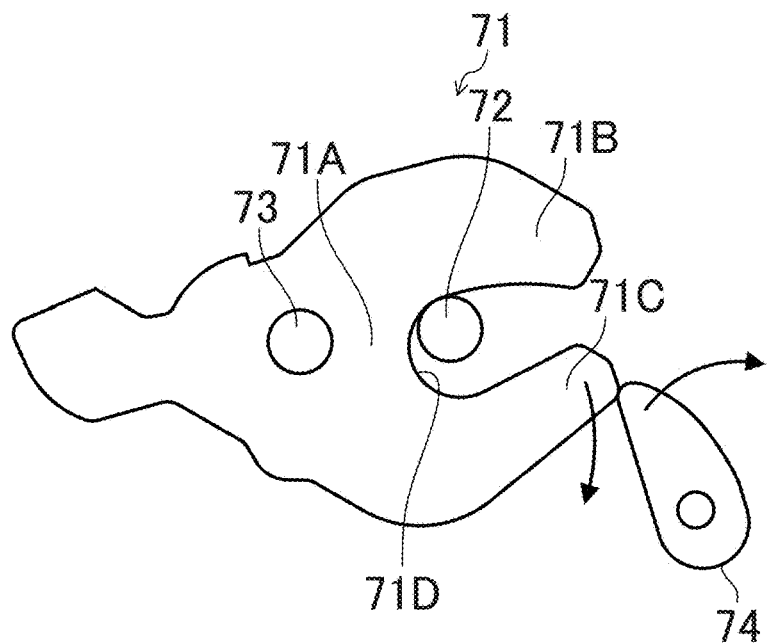
FIG. 3A is a diagram illustrating a fully-latched state in a closing mechanism.
Figure 3B:
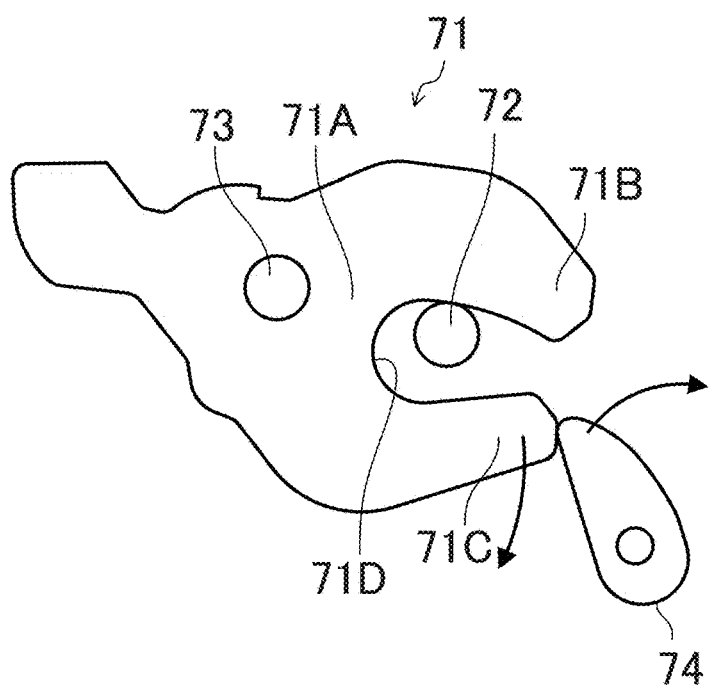
FIG. 3B is a diagram illustrating how transition from the fully-latched state to a half-latched state is made in the closing mechanism.
Figure 3C:
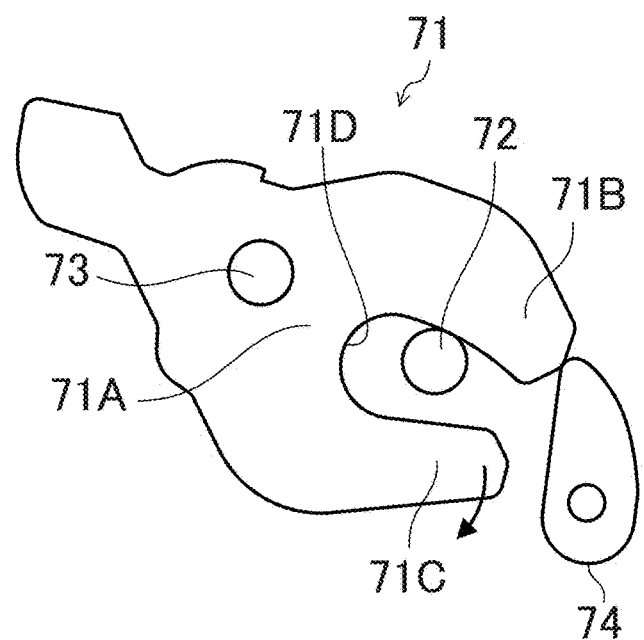
FIG. 3C is a diagram illustrating the half-latched state in the closing mechanism.
Figure 3D:
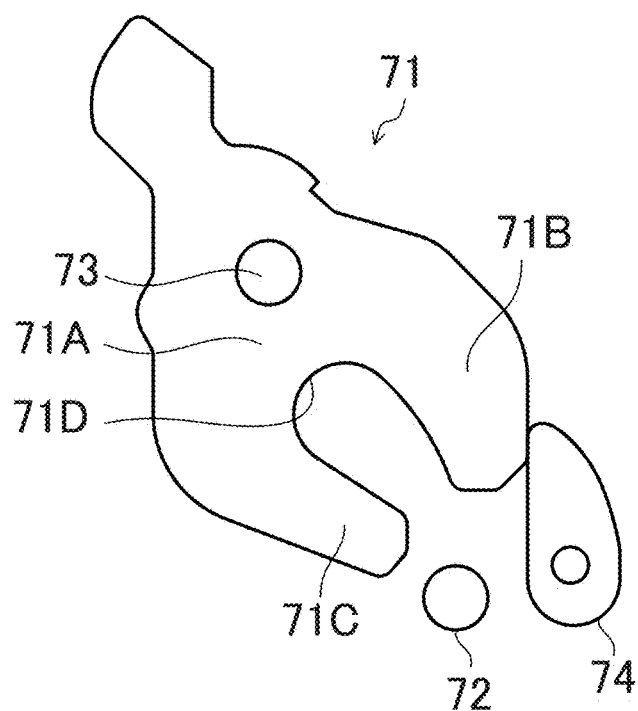
FIG. 3D is a diagram illustrating an unlatched state in the closing mechanism.

FIG. 2 is a partially enlarged side view of the rear portion of the automobile including the opening/closing body opening/closing device of the present embodiment. FIG. 3A is a diagram illustrating a fully-latched state in a closing mechanism. FIG. 3B is a diagram illustrating how transition from the fully-latched state to a half-latched state is made in the closing mechanism. FIG. 3C is a diagram illustrating the half-latched state in the closing mechanism. FIG. 3D is a diagram illustrating an unlatched state in the closing mechanism. The fully-latched state corresponds to "second state" of the present invention. The half-latched state corresponds to "first state" of the present invention.

As illustrated in FIG. 2 and FIG. 3A, closing mechanism 70 is a mechanism provided for locking opening/closing body 20 in the closed state with respect to opening 11. Closing mechanism 70 includes latch 71, striker 72, turning shaft 73, pole 74, and closure motor 75 (see FIG. 4).

Latch 71 is a member engageable with striker 72 and provided in an inner-side lower end portion of opening/closing body 20. Latch 71 includes base portion 71A, first arm 71B which extends from an upper end portion of base portion 71A, and second arm 71C which extends from a lower end portion of base portion 71A. First arm 71B and second arm 71C each extend in the same direction (in the direction from left to right in FIG. 3A) from base portion 71A. Latch 71 corresponds to "engaging portion" of the present invention.

Striker 72 is a member engageable with latch 71 and includes a rod-shape portion capable of entering recess portion 71D formed by base portion 71A, first arm 71B, and second arm 71C of latch 71. For example, a portion parallel in the left and right direction in FIG. 2 is the rod-shape portion of striker 72. Striker 72 corresponds to "engaged portion" (i.e., portion to be engaged) of the present invention.

Striker 72 is provided in a position such that the rod-shape portion is engaged with latch 71 in the fully-latched state when opening/closing body 20 is set in the closed state in a lower edge portion of opening 11 in opening member 10. Note that, in a case where latch 71 is provided on a side of opening member 10, striker 72 is provided on a side of opening/closing body 20. Latch 71 may be provided on a side of the vehicle body, and striker 72 may be provided on the inner-side lower end portion of opening/closing body 20.

Latch 71 is configured to be turnable about turning shaft 73. Latch 71 transitions among the fully-latched state (the state in FIG. 3A), the half-latched state (the state in FIG. 3C), and the unlatched state (the state in FIG. 3D) by turning by a driving force of closure motor 75, for example.

The fully-latched state is a state in which striker 72 is locked by latch 71. More specifically, the fully-latched state is a fully-engaged state in which engagement is made such that striker 72 cannot be separated from recess portion 71D of latch 71.

The half-latched state is a state in which the engagement force between latch 71 and striker 72 is smaller than the engagement force in the fully-latched state. More specifically, the half-latched state is a state in which striker 72 can be readily separated from recess portion 71D of latch 71 by application of an external force, and in which striker 72 is movable to a position where striker 72 is engageable with latch 71 (a position of the fully-latched state). The half-latched state may also be a state in which latch 71 is engageable with strike 72 by movement of striker 72 to latch 71 and a predetermined portion of a latch driving mechanism that drives latch 71.

The unlatched state is a state in which engagement between latch 71 and striker 72 is completely released.

Further, latch 71 may be energized by the energizing member (not illustrated) so as to turn in a clockwise direction in FIG. 3A to FIG. 3D. Thus, by controlling turning of pole 74 to be described later, latch 71 can be caused to turn from the fully-latched state to the unlatched state by the energizing force of the energizing member.

Pole 74 is a member capable of regulating turning of latch 71 and is provided in a position where pole 74 is capable of coming into contact with either of first arm 71B and second arm 71C of latch 71. Pole 74 is provided turnably and is controlled under driving of closure motor 75 so as to be positioned in a first position (see FIG. 3A), a second position (see FIG. 3C), and a third position (see FIG. 3D) from an upstream side in the clockwise direction.

Closure motor 75 is a DC motor or an AC motor, and changes the state of latch 71 in closing mechanism 70 by turning of latch 71 and pole 74. Note that, closure motor 75 is connected to control section 50, and rotational driving of both forward rotation and reverse rotation is controlled by control section 50. Closure motor 75 corresponds to "closing mechanism-side driving section" of the present invention.

An example of an operation in closing mechanism 70 will be described, herein. First, an operation when closing mechanism 70 transitions from the fully-latched state to the unlatched state will be described.

As illustrated in FIG. 3A, when pole 74 is in the first position, a leading end of second arm 71C in latch 71 in the fully-latched state comes into contact with pole 74. Thus, the turning of latch 71 is regulated, and thus, the fully-latched state of latch 71 is maintained.

As illustrated in FIG. 3B, when pole 74 turns in the clockwise direction from the first position, the contact state with second arm 71C is released. Latch 71 turns in the clockwise direction by the driving force of closure motor 75.

As illustrated in FIG. 3C, when pole 74 further turns and is positioned in the second position, pole 74 and first arm 71B of latch 71 come into contact with each other. At this time, latch 71 is in a position of the half-latched state, and the half-latched state of latch 71 is maintained by regulation of the turning of latch 71 by pole 74.

As illustrated in FIG. 3D, when pole 74 further turns and is positioned in the third position, the contact state between pole 74 and first arm 71B of latch 71 is released. Thus, latch 71 turns in the clockwise direction by the driving force of closure motor 75 and is positioned in the position of the unlatched state. That is, the engagement between latch 71 and striker 72 is completely released.

Moreover, the engagement force between latch 71 and striker 72 in the half-latched state is small as compared with the engagement force in the fully-latched state even without turning of pole 74 from the second position. For this reason, it is possible to release the engagement between latch 71 and striker 72 by a force to move opening/closing body 20 in the opening direction by the driving force of opening and closing motor 33.

Next, an operation for transition from the unlatched state to the fully-latched state will be described. First, as illustrated in FIG. 3C and FIG. 3D, latch 71 is engaged with striker 72 by movement of opening/closing body 20 by opening/closing body driving section 30 from the position of the unlatched state, and thus, closing mechanism 70 is set to the half-latched state.

Further, opening and closing motor 33 and closure motor 75 operate under the control of control section 50 to be described later and, as illustrated in FIG. 3B, latch 71 is turned in a counterclockwise direction so as to pull striker 72 into recess portion 71D of latch 71, and thus, closing mechanism 70 is set to the fully-latched state.

Note that, as long as closing mechanism 70 has a configuration capable of being driven by closure motor 75, closing mechanism 70 may adopt any configuration.

[Configuration of Control System]

FIG. 4 is a block diagram illustrating a control system of opening/closing body opening/closing device 1.

In opening/closing body opening/closing device 1, the control system includes control section 50, position detection section 60, and interaction detection section 80. The control system of opening/closing body opening/closing device 1 controls opening/closing body 20 driven by opening/closing body driving section 30 including opening and closing motor 33.

[Position Detection Section]

Position detection section 60 detects movement of the position of opening/closing body 20 by detecting, for example, an operation of opening/closing body driving section 30, and outputs movement information on opening/closing body 20, which is a result of the detection, to control section 50.

Position detection section 60 includes, for example, Hall elements, and detects the operation of opening/closing body driving section 30 and further the movement of the position of opening/closing body 20 by magnetically detecting a rotation state of opening and closing motor 33. In this case, magnets are positioned circumferentially with different intervals on a disk provided on the rotation shaft of opening and closing motor 33, and the Hall elements of position detection section 60 are disposed in positions facing the magnets. Pulses are generated by capturing magnets moving along with the rotation of the rotation shaft of opening and closing motor 33 by the Hall elements. Control section 50 calculates the position of opening/closing body 20 by a count value resulting from counting of the pulses and calculates a driving speed of opening/closing body 20 by a change in the count value.

Position detection section 60 counts the captured pulses, and control section 50 uses the count value as the movement information on opening/closing body 20 and makes the count value of the pulses usable for calculating the position and the driving speed of opening/closing body 20 in control section 50. Note that, it is also possible to adopt a configuration in which position detection section 60 not only counts pulses but also calculates the position and the driving speed of opening/closing body 20 based on the count value and outputs the result of calculation to control section 50.

Further, as long as position detection section 60 is capable of detecting information on the movement of the position of opening/closing body 20, position detection section 60 may adopt any configuration, and for example, position detection section 60 may be configured to directly detect the movement of the position of opening/closing body 20 without detecting the operation of opening/closing body driving section 30. The detection method is not limited to the detection performed magnetically using Hall elements, and any method may be adopted as long as a count value in accordance with the position of opening/closing body 20 can be generated. Further, although position detection section 60 has been described as a position detection section that is provided separately from control section 50 to be described later, position detection section 60 may be a position detection section incorporated into control section 50.

Note that, control section 50 may be configured to acquire a count value set in advance from a storage section and/or the like, for example, in accordance with the result of output from position detection section 60 in a case where position detection section 60 outputs an output value other than a count value to control section 50.

[Interaction Detection Section]

Interaction detection section 80 detects that latch 71 and striker 72 have interacted with each other. Specifically, interaction detection section 80 is provided in, for example, closing mechanism 70, detects a latch state of closing mechanism 70, and outputs a result of the detection to control section 50. Interaction detection section 80 detects the latch state, such as the half-latched state, based on the turning state of latch 71, for example.

Interaction detection section 80 includes a half-latch detection switch that transitions to an ON state when latch 71 is in a state of being engaged with striker 72, that is, in the state in FIG. 3C and transitions to an OFF state when latch 71 is in a state other than the state in FIG. 3C. Specifically, closing mechanism 70 is provided with a link mechanism (not illustrated), and the half-latch detection switch switches between the ON state and the OFF state in accordance with the turning state of latch 71 via the link mechanism. Thus, control section 50 to be described later determines whether or not closing mechanism 70 is in the half-latched state, based on a signal of the ON state and a signal of the OFF state which are outputted from interaction detection section 80.

Further, interaction detection section 80 may include a switch capable of detecting the unlatched state and/or the fully-latched state.

Moreover, as long as interaction detection section 80 is capable of detecting the latch state of closing mechanism 70, interaction detection section 80 may be any interaction detection section.

Further, interaction detection section 80 may not be provided in opening/closing body opening/closing device 1. In this case, opening/closing body opening/closing device 1 may be configured to acquire a detection signal of the latch state from an outside.

[Control Section]

Control section 50 includes a central processing unit (CPU), a read only memory (ROM), a random access memory (RAM) and/or the like. The CPU reads a program from the ROM in accordance with a processing content, loads the program into the RAM, and performs centralized control for operation of each block of opening/closing body opening/closing device 1 in cooperation with the loaded program. At this time, various types of data stored in a storage section (illustration is omitted) are referred to. The storage section (illustration is omitted) is, for example, formed of a non-volatile semiconductor memory (so-called flash memory) and/or a hard disk drive. Control section 50 may be, for example, incorporated into an electronic control unit (ECU) which controls each part of a vehicle, or may be mounted on opening/closing body driving section 30.

When control section 50 acquires interaction information on occurrence of interaction between latch 71 and striker 72 from interaction detection section 80, control section 50 causes closure motor 75 to perform closing driving that causes latch 71 to transition from the unlatched state to the fully-latched state. Specifically, control section 50 performs control such that the closing driving described above is performed by movement of latch 71 from the state of FIG. 3D to an engageable position illustrated in FIG. 3C, where latch 71 and striker 72 are engageable, by movement of opening/closing body 20.

After the closing driving described above is performed, control section 50 sets a zero position in a case where a positional difference between a current position of opening/closing body 20 and the engageable position of opening/closing body 20 is within a predetermined range after comparison between the current position and the engageable position.

The current position of opening/closing body 20 is a position of opening/closing body 20 based on current position information on opening/closing body 20 acquired by position detection section 60. The current position of opening/closing body 20 is stored in the storage section (not illustrated) at any time based on a result of detection of position detection section 60.

The engageable position is a position of opening/closing body 20 such that the positional relationship between latch 71 and striker 72 is, for example, a positional relationship as illustrated in FIG. 3C, and can be set as appropriate based on positional information set in advance by an experiment and/or the like. Information on the engageable position may also be set based on position information on an engageable position at the time of a past operation such as a previous operation.

The positional difference between the current position and the engageable position is, for example, a difference value between a count value corresponding to the current position by position detection section 60 and a count value corresponding to the engageable position.

The predetermined range is a range in which a deviation of the current position of opening/closing body 20 from the engageable position is allowable to the extent that latch 71 can pull in striker 72. That is, even in a case where the count value corresponding to the current position of opening/closing body 20 differs from the count value corresponding to the engageable position, latch 71 can pull in striker 72 when the positional difference between the current position and the engageable position is within the predetermined range.

A deviation of a count value may be caused by an occurrence of a transmission error in pulse signal detection due to change with time and/or the like and an accumulation of the transmission error and/or the like. Accordingly, in the present embodiment, even when a deviation of a count value occurs, opening/closing body 20 can be surely locked in the fully-closed position by closing mechanism 70 in a case where the positional difference between the current position and the engageable position is within the predetermined range.

Zero position setting is to set position information indicating a current position of opening/closing body 20 stored in the storage section to a zero position. The zero position is a position when opening/closing body 20 is set to the fully-closed position, and serves as a reference in the control of movement of opening/closing body 20. The count value corresponding to the zero position is, for example, 0.

For example, it is assumed that the count value by position detection section 60 in the fully-closed position (the fully-latched position) of opening/closing body 20 is 0 and that the count value by position detection section 60 in the fully-open position (the position illustrated in FIG. 1) is 1500. In this case, the count value corresponding to each position from the fully-closed position to the fully-open position is in a count value range of 0 to 1500 and is set to be larger from the fully-closed position toward the opening direction.

Here, when opening/closing body 20 is closed and thereby is positioned in the engageable position, and in a case where the count value deviates, within an approximately predetermined range, with respect to position information corresponding to the engageable position, opening/closing body 20 is locked in the fully-closed position. However, since the position of opening/closing body 20 deviates from the engageable position, the position of opening/closing body 20 becomes the fully-closed position, with the count value of the current position in the storage section being a value other than 0. When the next control of movement of opening/closing body 20 is performed while the count value in the fully-closed position is a value other than 0, an accurate movement control is not performed due to the deviation of the count value of the position serving as a reference.

For this reason, the zero position setting is performed when opening/closing body 20 is positioned in the fully-closed position. Thus, when opening/closing body 20 is positioned in the fully-closed position, the count value corresponding to the current position is reset to 0, and thus, it is possible to accurately perform the next control of movement of opening/closing body 20.

Further, in a case where the positional difference between the engageable position and the current position is outside the predetermined range, control section 50 causes closure motor 75 to perform return driving that sets latch 71 from the fully-latched state to the unlatched state that is the open state. In a case where the positional difference between the engageable position and the current position is outside the predetermined range, it is difficult to lock opening/closing body 20 in the fully-closed position by closing mechanism 70. Accordingly, control section 50 causes latch 71 to be in a state of being engageable with striker 72.

Figure 5A:
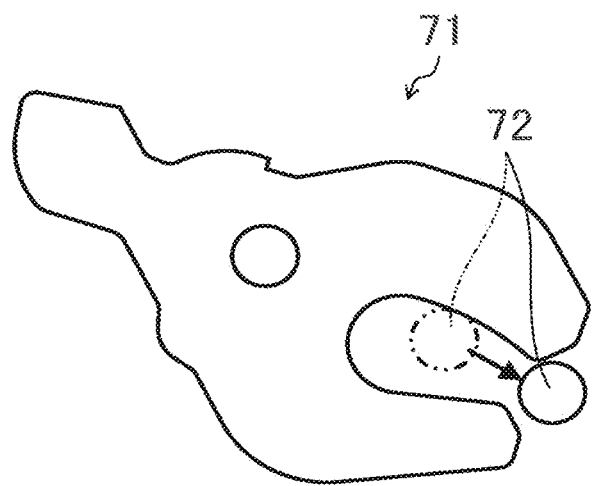
FIG. 5A is a diagram illustrating what it looks like when engagement between a latch and a striker is disengaged while the closing mechanism is in the half-latched state.

As illustrated in FIG. 5A, in a case where a certain action is applied to opening/closing body 20 when latch 71 and striker 72 is in the engageable position, latch 71 may be set to the fully-latched state in a state in which the position of opening/closing body 20 deviates, thereby an unlocked state may arise in which latch 71 and striker 72 cannot engage with each other.

Examples of the action applied to opening/closing body 20 include an action in which, in a case where latch 71 and striker 72 are caused to transition from the half-latched state to the fully-latched state when the opening and closing operation of opening/closing body 20 is performed in a slope, opening/closing body 20 moves from the position of the half-latched state by application of gravity along an inclined surface to opening/closing body 20. Further, examples of the action applied to opening/closing body 20 also include an action in which, when latch 71 and striker 72 are caused to transition from the half-latched state to the fully-latched state, opening/closing body 20 moves from the position of the half-latched state by application of an external force to opening/closing body 20.

Figure 5B:
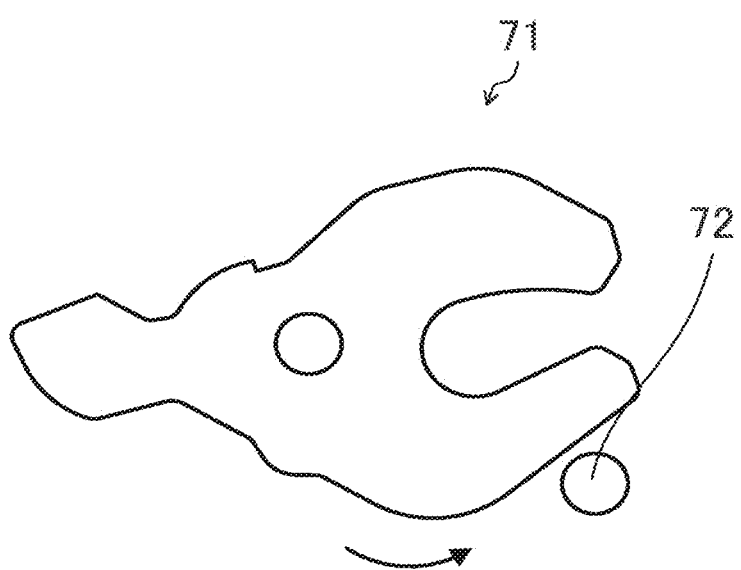
FIG. 5B is a diagram illustrating what it looks like when the closing mechanism has transitioned to the fully-latched state from a state illustrated in FIG. 5A.

In such cases, as illustrated in FIG. 5B, even when latch 71 is turned to the position of the fully-latched state, striker 72 cannot be pulled in, and thus, the unlocked state arises in which opening/closing body 20 is not locked by closing mechanism 70. The unlocked state is included as an example in the "second state" of the present invention. That is, the second state is a state in which, regardless of a locked state and the unlocked state, latch 71 has moved to the position of the fully-latched state (FIG. 3A or FIG. 5B) where latch 71 is originally supposed to lock striker 72.

Figure 6:
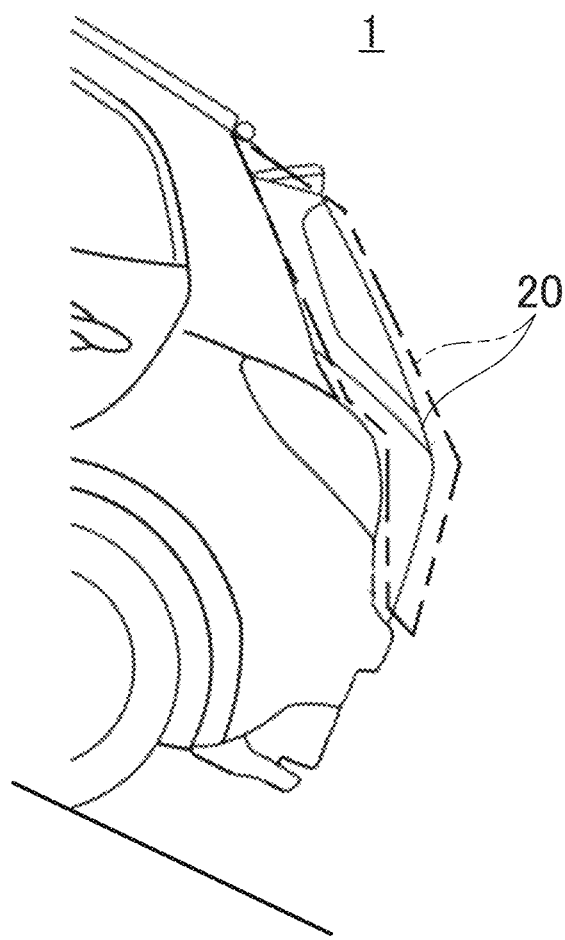
FIG. 6 is a diagram illustrating a half-open state of an opening/closing body.

When the zero position setting is performed in this unlocked state in which latch 71 is set in the position of the fully-latched state, the current position is stored in the storage section on the assumption that the position of a half-open state (see the long dashed double-short dashed line) of opening/closing body 20 as illustrated in FIG. 6 is the fully-closed position, for example. That is, the next opening operation of opening/closing body 20 will start from the position of the half-open state of opening/closing body 20. The opening operation of opening/closing body 20 will start from a side closer to the position, when opening/closing body 20 is fully opened, than to the position of the fully-latched state.

Accordingly, in the opening operation described above, a problem arises that opening/closing body 20 cannot be accurately moved since there is a slight difference in the count value between the position of the half-open state and the fully-closed position. For example, in a case where opening/closing body 20 is moved from the position of the half-open state, where the count value corresponding to the position of the half-open state of opening/closing body 20 is assumed to be 100, to the fully-open position (count value: 1500), opening/closing body 20 arrives at the fully-open position by movement equivalent to a count value of 1400.

However, when the zero position setting is performed in the position of the half-open state, the count value of the above position is set to 0 and opening/closing body 20 then attempts to perform movement equivalent to a count value of 1500 to the fully-open position.

In this case, opening/closing body 20 arrives at the fully-open position by movement equivalent to a count value of 1400, and further attempts to perform movement equivalent to a count value of 100. That is, although opening/closing body 20 has arrived at the fully-open position, opening/closing body 20 attempts to move further upward from the fully-open position. As a result, an excessive load is applied to opening/closing body driving section 30 of opening/closing body 20, and further a problem arises, such as damage to opening/closing body driving section 30.

Accordingly, in the present embodiment, closing mechanism 70 is set from the fully-latched state to the unlatched state in a case where the positional difference between the current position and the engageable position of opening/closing body 20 is outside the predetermined range. Thus, closure motor 75 can set latch 71 to the open state as the return driving and closing mechanism 70 can lock opening/closing body 20.

In the present embodiment, after the return driving is performed, control section 50 causes opening/closing body driving section 30 to perform recovery driving that moves opening/closing body 20 from the current position to the engageable position. After the recovery driving is performed, control section 50 causes closure motor 75 to perform the closing driving again. Note that, the recovery driving not necessarily needs to be performed. In a case where control section 50 does not perform the recovery driving, opening/closing body 20 may be set to a free state such that opening/closing body 20 is moved from the current position to the engageable position manually by a person or the like.

In this way, it is possible to set opening/closing body 20 to the locked state by closing mechanism 70. As a result of opening/closing body 20 being in the locked state, opening/closing body 20 can be positioned in a position for which the zero position setting is performed.

After the return driving is performed, control section 50 may perform the zero position setting when latch 71 of closing mechanism 70 transitions to the fully-latched state, but need not necessarily perform the zero position setting.

That is, in the present embodiment, it is possible to move opening/closing body 20 to an originally supposed position where opening/closing body 20 can be locked, even when closing mechanism 70 operates while opening/closing body 20 is in an improper position. That is, in the opening operation, opening/closing body 20 can operate from a position substantially the same as the fully-closed position where the zero position setting is performed, and thus, it is possible to normally move opening/closing body 20.

When opening/closing body 20 is moved from the fully-closed position to the fully-open position, control section 50 causes opening/closing body driving section 30 to perform driving that moves opening/closing body 20 until opening/closing body 20 moves from the zero position by a predetermined amount. The predetermined amount is the amount of movement of opening/closing body 20 from the fully-closed position to the fully-open position, which is, for example, the amount of movement equivalent to a predetermined count value (for example, 1500) by position detection section 60.

Thus, since control section 50 is capable of suppressing an excessive movement of opening/closing body 20 over the fully-open position, it is possible to suppress application of an excessive load to opening/closing body driving section 30.

[Driving Control of Opening/Closing Body in Opening/Closing Body Opening/Closing Device]

Figure 7:
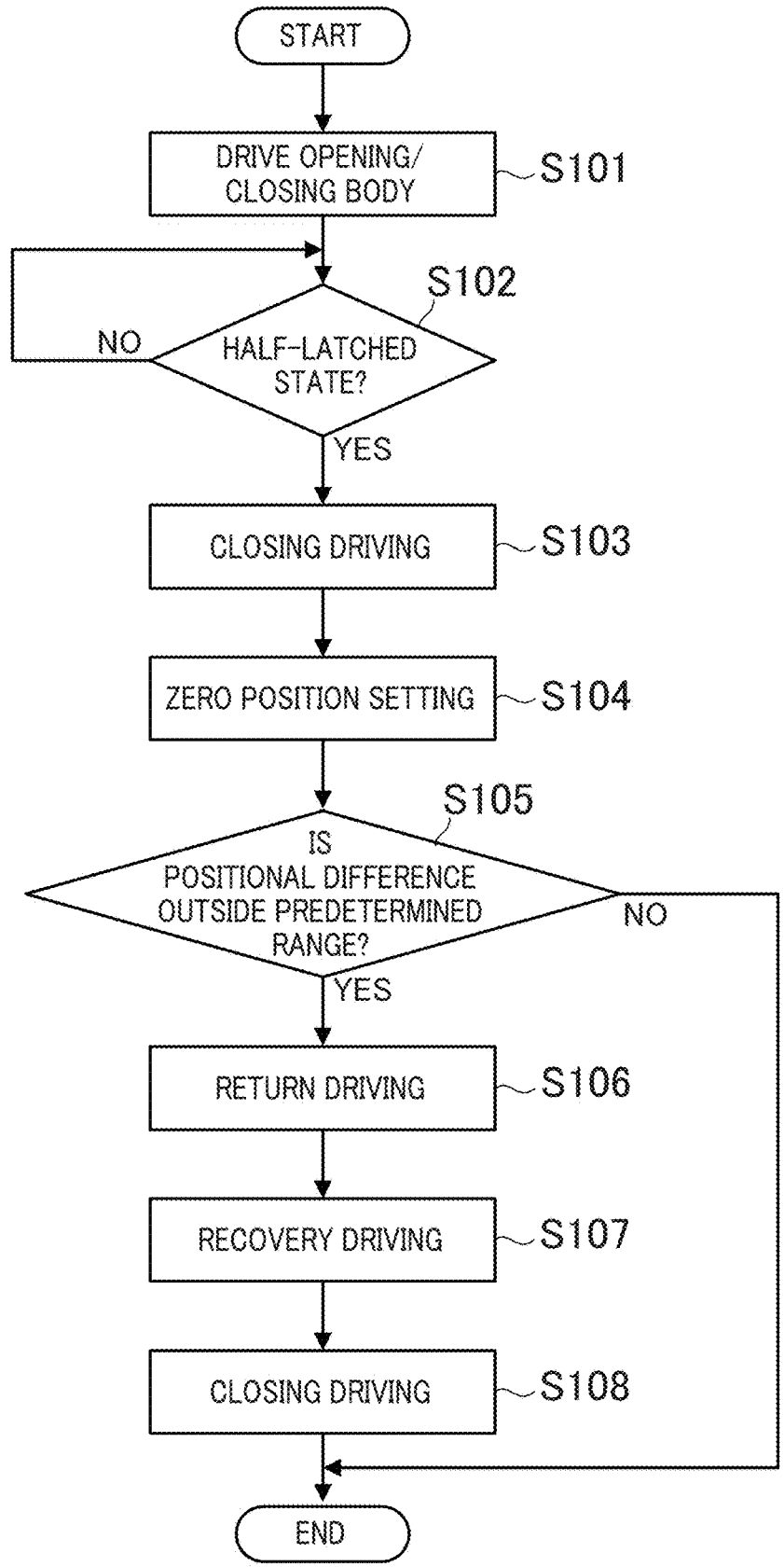
FIG. 7 is a flowchart provided for describing control of opening and closing the opening/closing body in the opening/closing body opening/closing device.

FIG. 7 is a flowchart provided for describing control of opening and closing the opening/closing body in opening/closing body opening/closing device 1. Note that, the control in FIG. 7 assumes control when an operation instruction to move opening/closing body 20 to the fully-closed position is received when opening 11 is in the open state.

As illustrated in FIG. 7, control section 50 controls opening/closing body driving section 30 so as to drive opening/closing body 20 (step S101). Next, control section 50 determines whether or not latch mechanism 70 is in the half-latched state, based on a result of detection of latch-state detection section 80 (step S102).

In a case where latch mechanism 70 is not in the half-latched state as a result of the determination (step S102, NO), the processing of step S102 is repeated. Meanwhile, in a case where latch mechanism 70 is in the half-latched state (step S102, YES), control section 50 causes closure motor 75 to perform the closing driving (step S103). Control section 50 then performs the zero position setting (step S104)

Control section 50 determines whether or not the positional difference between the current position and the engageable position of opening/closing body 20 is outside the predetermined range (step S105). In a case where the positional difference is within the predetermined range as a result of the determination (step S105, NO), the processing ends.

In a case where the positional difference is outside the predetermined range (step S105, YES), on the other hand, control section 50 causes closure motor 75 to perform the return driving (step S106). Control section 50 then causes opening/closing body driving section 30 to perform the recovery driving (step S107).

Next, control section 50 causes closure motor 75 to perform the closing driving (step S108). After step S108, the control ends. The recovery driving (step S107) is not necessarily essential, and the control can also end after performing the return driving such that closure motor 75 sets latch 71 to the open state (step S106).

According to the present embodiment configured as described above, when the closing driving is performed, the return driving is performed in accordance with the difference between the current position and the engageable position of opening/closing body 20. That is, it is possible to lock opening/closing body 20 in the originally supposed position even when closing mechanism 70 operates in a state in which opening/closing body 20 is in an improper position. As a result, since opening/closing body 20 can be surely locked by closing mechanism 70, it is possible to normally move opening/closing body 20 in the opening operation.

Further, since the position of opening/closing body 20 can be set by a simple method to the originally supposed position where the zero position setting is performed, it is not necessary to narrow the amount of movement of opening/closing body 20. As a result, it is possible to improve convenience of opening/closing body opening/closing device 1.

Further, since the movement of opening/closing body 20 can be stopped in the fully-open position when opening/closing body 20 is moved to the fully-open position, it is possible to suppress application of an excessive load to opening/closing body driving section 30.

Note that, although the position of the half-latched state has been illustrated as an example of the engageable position in the embodiment described above, the present invention is not limited thereto. For example, the position of the unlatched state may be configured as the engageable position as long as the position allows latch 71 to pull striker 72 into the position of the fully-latched state, such as a state in which striker 72 enters recess portion 71D of latch 71.

Further, although control section 50 controls opening/closing body driving section 30 and closing mechanism 70 in the embodiment described above, the present invention is not limited thereto. It is also possible to adopt a configuration in which a plurality of control sections separately control each of the opening/closing body driving section and the closing mechanism.

The embodiment disclosed this time is only exemplary in every aspect and should be considered non-restrictive. The scope of the present invention is indicated not by the description above but by claims, and it is intended that every change within meaning or range equivalent to the claims is included.

The embodiment of the present invention has been described thus far. Note that, the above description is only illustration of a preferred embodiment of the present invention, and the scope of the present invention is not limited thereto. That is, the descriptions of the configuration of the above-mentioned device and the shape of each portion are only exemplary, and it is obvious that various changes and additions to these examples are possible within the scope of the present invention.

INDUSTRIAL APPLICABILITY

The opening/closing body opening/closing device according to the present invention is useful as an opening/closing body opening/closing device capable of locking an opening/closing body in an originally supposed position even when a closing mechanism operates while the opening and the closing body is in an improper position.

REFERENCE SIGNS LIST

1 Opening/closing body opening/closing device
10 Opening member
11 Opening
20 Opening/closing body
30 Opening/closing body driving section
31 Main-body cylinder portion
32 Sliding cylinder portion
33 Opening and closing motor
50 Control section
60 Position detection section
70 Closing mechanism
71 Latch
71A Base portion
71B First arm
71C Second arm
71D Recess portion
72 Striker
73 Turning shaft
74 Pole
75 Closure motor
80 Interaction detection section

The invention claimed is:

1. An automobile hatch opening/closing device, comprising:
  a hatch that is configured to open and close with respect to a rear opening of an automobile;
  a closing mechanism that is configured to lock the hatch in a closed state;
  a hatch driving section that is configured to cause the hatch to transition to an open state or the closed state;
  a processor that is configured to control driving of the closing mechanism and the hatch driving section; and
  a position detection section that is configured to detect a position of the hatch,
  wherein the closing mechanism includes:
    an engaging portion provided in one of the automobile or the hatch;
    an engaged portion provided in another of the automobile or the hatch;
    a closing mechanism-side driving section that is configured to cause the engaging portion to transition between the open state and the closed state; and
    an interaction detection section that is configured to detect that the engaging portion and the engaged portion have interacted with each other,
  wherein the open state of the engaging portion includes:
    a first state in which the engaged portion is movable to a position where the engaged portion is engageable with the engaging portion; and
    an unlatched state in which engagement between the engaging portion and the engaged portion is released,
  wherein the closed state of the engaging portion includes a second state in which the engaged portion is locked by the engaging portion,
  wherein the processor is configured to:
    cause the closing mechanism-side driving section to drive the engaging portion to transition from the first state to the second state, when the processor acquires interaction information on occurrence of interaction between the engaging portion and the engaged portion;
    determine a first position of the hatch after the driving, determine a second position of the hatch when the engaged portion is engageable with the engaging portion, and determine a difference between the first position and the second position as the positional difference;
    cause the closing mechanism-side driving section to set the engaging portion from the second state to the unlatched state so as to allow the closing mechanism to lock the hatch through the engagement between the engaging portion and the engaged portion in a case where the positional difference is outside a predetermined range; and
    cause the closing mechanism-side driving section to perform the driving again, after the setting is performed.

2. The automobile hatch opening/closing device according to claim 1, wherein:
  the automobile is a vehicle body, and
  the hatch is a back door of a vehicle.

3. The automobile hatch opening/closing device according to claim 1, wherein the engaging portion includes a latch.

4. The automobile hatch opening/closing device according to claim 1, wherein the engaged portion includes a striker.

5. The automobile hatch opening/closing device according to claim 1, wherein the closing mechanism-side driving section includes a closure motor.

6. The automobile hatch opening/closing device according to claim 1, wherein the interaction detection section includes a switch.

* * * * *